US012125334B2

(12) United States Patent
Chittenden, Jr. et al.

(10) Patent No.: US 12,125,334 B2
(45) Date of Patent: *Oct. 22, 2024

(54) SYSTEM AND METHOD TO PROCESS TRANSACTIONS AT RETAIL FUELING STATIONS USING A MOBILE DEVICE

(71) Applicant: Wayne Fueling Systems LLC, Austin, TX (US)

(72) Inventors: Thomas Sherfey Chittenden, Jr., Pflugerville, TX (US); Paul Matthew Kern, Austin, TX (US); Bradford Ian Loewy, Austin, TX (US); Sethuraman Subramanian, Austin, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/324,232

(22) Filed: May 26, 2023

(65) Prior Publication Data

US 2023/0298428 A1 Sep. 21, 2023

Related U.S. Application Data

(60) Division of application No. 17/239,779, filed on Apr. 26, 2021, now Pat. No. 11,699,319, which is a
(Continued)

(51) Int. Cl.
*G06Q 40/00* (2023.01)
*G06Q 20/14* (2012.01)
(Continued)

(52) U.S. Cl.
CPC ......... *G07F 15/001* (2013.01); *G06Q 20/145* (2013.01); *G06Q 20/32* (2013.01); *G07F 13/025* (2013.01)

(58) Field of Classification Search
None
See application file for complete search history.

(56) References Cited

U.S. PATENT DOCUMENTS

| 4,199,100 A | 4/1980 | Wostl et al. |
| 5,797,470 A | 8/1998 | Bohnert et al. |

(Continued)

FOREIGN PATENT DOCUMENTS

| CN | 101019146 A | 8/2007 |
| DE | 102007032676 A1 | 2/2009 |

(Continued)

OTHER PUBLICATIONS

U.S. Appl. No. 13/853,387, U.S. Pat. No. 10,997,814, filed Mar. 29, 2013, Thomas S. Chittenden et al.
(Continued)

*Primary Examiner* — Olabode Akintola
(74) *Attorney, Agent, or Firm* — Mintz, Levin, Cohn, Ferris, Glovsky and Popeo, P.C.

(57) ABSTRACT

A method of processing a transaction includes receiving a site location code. Site configuration information corresponding to the received site location code is received from a database. That information includes more product record(s), each corresponding to a reservable product or a non-reservable product. A selection of one or more of the product records in the retrieved information is received. If any selected product record corresponds to a reservable product, a reservation command is produced. That command requests reservation of selected reservable product(s). A method of selecting a product includes receiving a location input and determining a site location code with it. The site location code is transmitted and one or more product records are received. Representations of one or more of the received
(Continued)

product records are presented and a selection of products is received. An indication of the selection is transmitted.

15 Claims, 7 Drawing Sheets

Related U.S. Application Data continuation of application No. 13/853,387, filed on Mar. 29, 2013, now Pat. No. 10,997,814.

(60) Provisional application No. 61/711,093, filed on Oct. 8, 2012.

(51) Int. Cl.
*G06Q 20/32* (2012.01)
*G07F 13/02* (2006.01)
*G07F 15/00* (2006.01)

(56) References Cited

U.S. PATENT DOCUMENTS

| | | | |
|---|---|---|---|
| 8,032,414 B2 | 10/2011 | Payne et al. | |
| 8,140,386 B2 | 3/2012 | Mankoff | |
| 10,997,814 B2 | 5/2021 | Chittenden, Jr. et al. | |
| 2001/0027422 A1 | 10/2001 | Brandrud | |
| 2001/0045457 A1 | 11/2001 | Terranova et al. | |
| 2003/0025600 A1* | 2/2003 | Blanchard | G06Q 20/32 340/539.1 |
| 2003/0028285 A1 | 2/2003 | Zura et al. | |
| 2005/0049981 A1 | 3/2005 | Mixon | |
| 2008/0167961 A1 | 7/2008 | Wentker et al. | |
| 2009/0024525 A1 | 1/2009 | Blumer et al. | |
| 2010/0049654 A1 | 2/2010 | Pilo et al. | |
| 2011/0193522 A1 | 8/2011 | Uesugi | |
| 2011/0225057 A1 | 9/2011 | Webb et al. | |
| 2011/0238574 A1 | 9/2011 | Miller et al. | |
| 2011/0295415 A1 | 12/2011 | Bartlett et al. | |
| 2011/0320345 A1 | 12/2011 | Taveau et al. | |
| 2012/0036042 A1 | 2/2012 | Graylin et al. | |
| 2012/0036073 A1 | 2/2012 | Basu et al. | |
| 2012/0089470 A1* | 4/2012 | Barnes, Jr. | H04M 1/724 705/16 |
| 2012/0101887 A1 | 4/2012 | Harvey et al. | |
| 2012/0191242 A1 | 7/2012 | Outwater et al. | |
| 2012/0209657 A1 | 8/2012 | Connolly | |
| 2012/0231771 A1 | 9/2012 | Marcus | |
| 2012/0253973 A1 | 10/2012 | Harter | |
| 2012/0316989 A1* | 12/2012 | Wong | G06Q 10/087 705/26.9 |
| 2012/0323632 A1* | 12/2012 | Bender | G06Q 40/06 705/7.31 |
| 2013/0085968 A1* | 4/2013 | Schultz | G06F 3/1292 358/1.14 |
| 2014/0074714 A1 | 3/2014 | Melone et al. | |
| 2021/0241563 A1 | 8/2021 | Chittenden, Jr. et al. | |

FOREIGN PATENT DOCUMENTS

| | | | |
|---|---|---|---|
| JP | 2002074504 A | 3/2002 | |
| KR | 20070059604 A | 6/2007 | |
| KR | 100751530 B1 | 8/2007 | |
| WO | WO-01/11858 A1 | 2/2001 | |
| WO | WO-01/52202 A1 | 7/2001 | |
| WO | WO-2006/107610 A2 | 10/2006 | |
| WO | WO-2009138131 A1 | 11/2009 | |
| WO | WO-2013153378 A1 | 10/2013 | |

OTHER PUBLICATIONS

U.S. Appl. No. 17/239,779, N/A, filed Apr. 26, 2021, Thomas S. Chittenden et al.
Australian Office Action issued Aug. 16, 2016 in AU Application No. 2013329613.
Australian Office Action issued Feb. 8, 2016 in AU Application No. 2013329613.
Australian Office Action issued May 24, 2018 in AU Application No. 2013292312.
Chinese Office Action and Search Report for Application No. 201380063402.X issued on Jun. 19, 2017.
European Search Report issued Nov. 19, 2015 in EP Application No. 13820070.4.
Indian Examination Report for IN App. No. 1019/DELNP/2015 issued on Mar. 9, 2020.
New Zealand Office Action for Application No. 704281, dated Oct. 21, 2016.
PCT Search Report and Written Opinion issued May 2, 2014 in connection with corresponding PCT Patent Application No. PCT/US2013/063349.

* cited by examiner

SYSTEM AND METHOD TO PROCESS TRANSACTIONS AT RETAIL FUELING STATIONS USING A MOBILE DEVICE

CROSS-REFERENCE TO RELATED APPLICATIONS

This present application is divisional of U.S. patent application Ser. No. 17/239,779, now U.S. Pat. No. 11,399,319, filed on Apr. 26, 2021, and entitled "System and Method to Process Transactions at a Retail Fueling Stations Using a Mobile Device," which is a continuation of U.S. patent application Ser. No. 13/853,387, now U.S. Pat. No. 10,997,814, filed on Mar. 29, 2013 and entitled "System and Method to Process Transactions at a Retail Fueling Stations Using a Mobile Device," which claims the benefit of priority to U.S. Provisional Patent Application Ser. No. 61/711,093, filed on Oct. 8, 2012 and entitled "Method and Process for Selling Items and/or Services at a Dispenser Using a Mobile Device Application," the entire contents of which are hereby incorporated by reference herein in their entireties.

FIELD

The subject matter disclosed herein relates to processing of transactions related to products and, in particular, to embodiments of systems and methods that facilitate transactions at retail fueling stations that occur via mobile devices.

BACKGROUND

Fueling stations offer various products to end users and complete transactions at automated or semi-automated fuel dispensers. Conventional fuel dispensers can receive payment information (e.g., a swiped debit card) and dispense fuel. These fuel dispensers communicate with a point-of-sale (POS) system to process credit-card transactions by preauthorizing the card before fueling and charging the appropriate amount to the card after fueling. The fuel dispensers can also prompt the user to purchase other products, e.g., a car wash. Any additional purchases or special offers are included in the final amount charged to the card. To complete the transaction, the payment terminal in the fuel dispenser can send this final amount to the POS, which communicates with a payment network to process and complete the transaction.

An increasing number of payment options are available, such as mobile-telephone payment systems (sometimes called "electronic wallets"). Examples of such systems are those based on the EMV standard, e.g., PAYPASS® by MASTERCARD®. However, these systems generally deal with purchase transactions for a fixed amount. Therefore, even if a mobile device is used for payment, the end user must still interact with the payment terminal on the dispenser for any function other than charging the final amount.

BRIEF SUMMARY OF THE INVENTION

The present disclosure describes improvements to the transaction process at retail fueling stations. These improvements offer more flexibility, for example, to complete transactions that include products in addition to a fuel purchase without the need to interact with the fuel dispenser. For example, methods and systems in the discussion that follows below advantageously permit an end user to utilize a mobile device (e.g., a smartphone and/or other terminal) to order fuel, car washes, or other products at a retail fueling station. These methods and systems allow the end user to interact with the mobile device to select from a list of products provided by a transaction gateway component remote from the retail location. In this way, the end user can order products using the mobile device from inside an automobile, either at the site or while en route to the site. This feature can prove beneficial in the winter because the end user can order products without having to remove his gloves outside in the cold.

BRIEF DESCRIPTION OF THE DRAWINGS

Reference is now made briefly to the accompanying figures, in which.

Where applicable, like reference characters designate identical or corresponding components and units throughout the several views, which are not to scale unless otherwise indicated.

DETAILED DESCRIPTION

Figure 1:
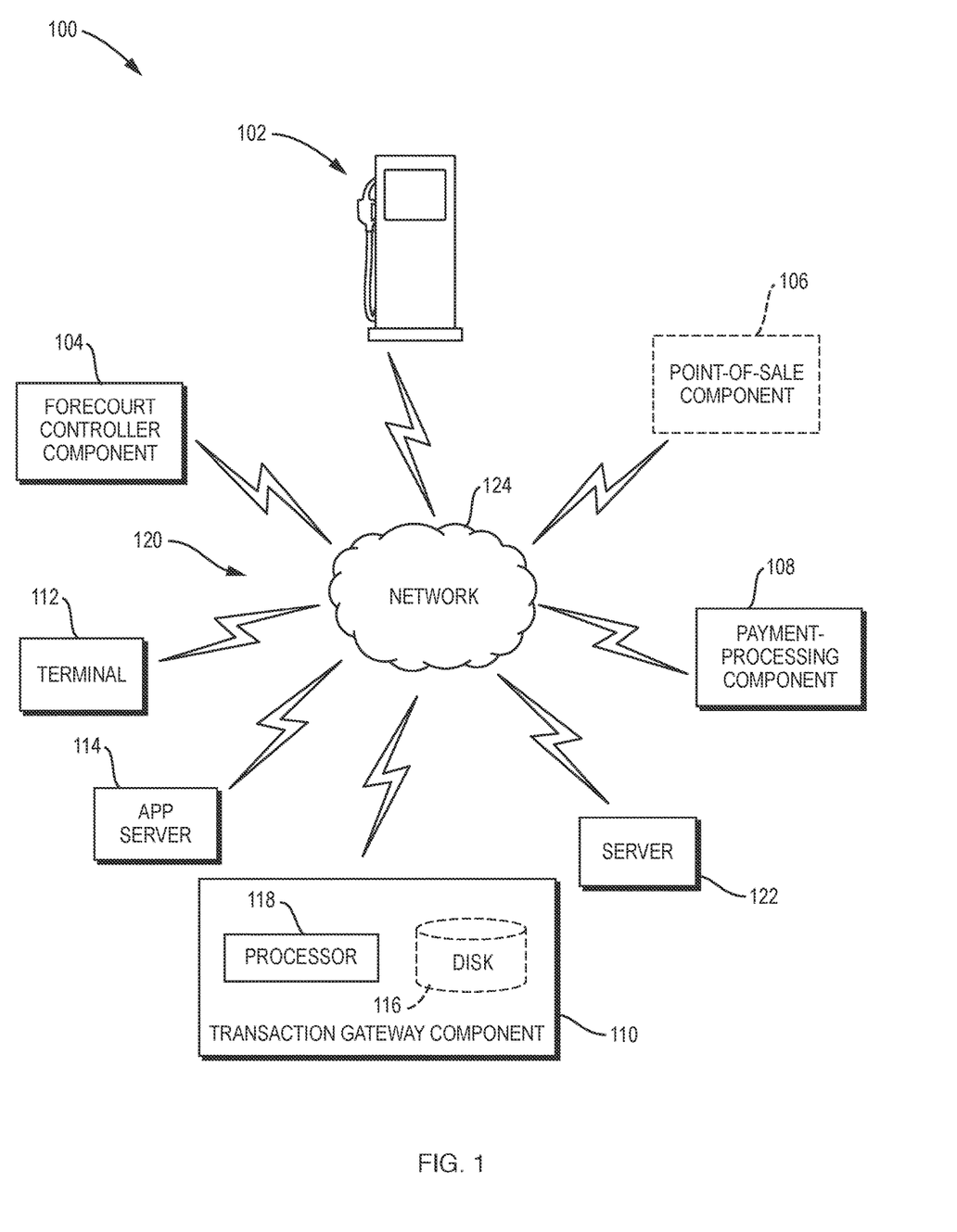
FIG. 1 depicts a schematic diagram of an exemplary embodiment of a transaction-processing system for use to complete transactions at a retail fueling station.

FIG. 1 illustrates a schematic diagram of an exemplary embodiment of a transaction-processing system 100 (also "system 100") that can process transactions, for example, that occur at retail fueling stations. The transaction-processing system 100 includes various components including, in one embodiment, a dispenser 102, a forecourt controller component 104, a point-of-sale (POS) component 106, and a payment-processing component 108. The system 100 also includes a transaction gateway component 110, a terminal 112, and an app server 114. Examples of the terminal 112 can include a variety of portable computing devices (e.g., computers, cellular phones, smartphones, tablets, personal digital assistants, laptops, etc.). The transaction gateway component 110 has a disk 116 and a processor 118, both of which can perform various functions useful for processing transactions that occur at the retail fueling station. In one embodiment, the components of the system 100 can communicate via a network system 120 that has one or more one or more remote servers (e.g., remote server 122) and one or more networks 124, e.g., wired and wireless networks.

Embodiments of the system 100 allow an end user to purchase products and services using the terminal 112. However, unlike conventional systems, the system 100 permits use of the terminal 112 to complete purchases that include fuel and, for example, services (e.g., a car wash) that the end user could not normally purchase without interactions with certain components (e.g., the dispenser 102) and/or attendants at the retail fueling station. This feature, among others, promotes effective use of remote transactions, where the end user can use the terminal 112 for all parts of the purchase, i.e., selection of products and services, use of loyalty offers and coupons, and initiation of payment.

Figure 2:
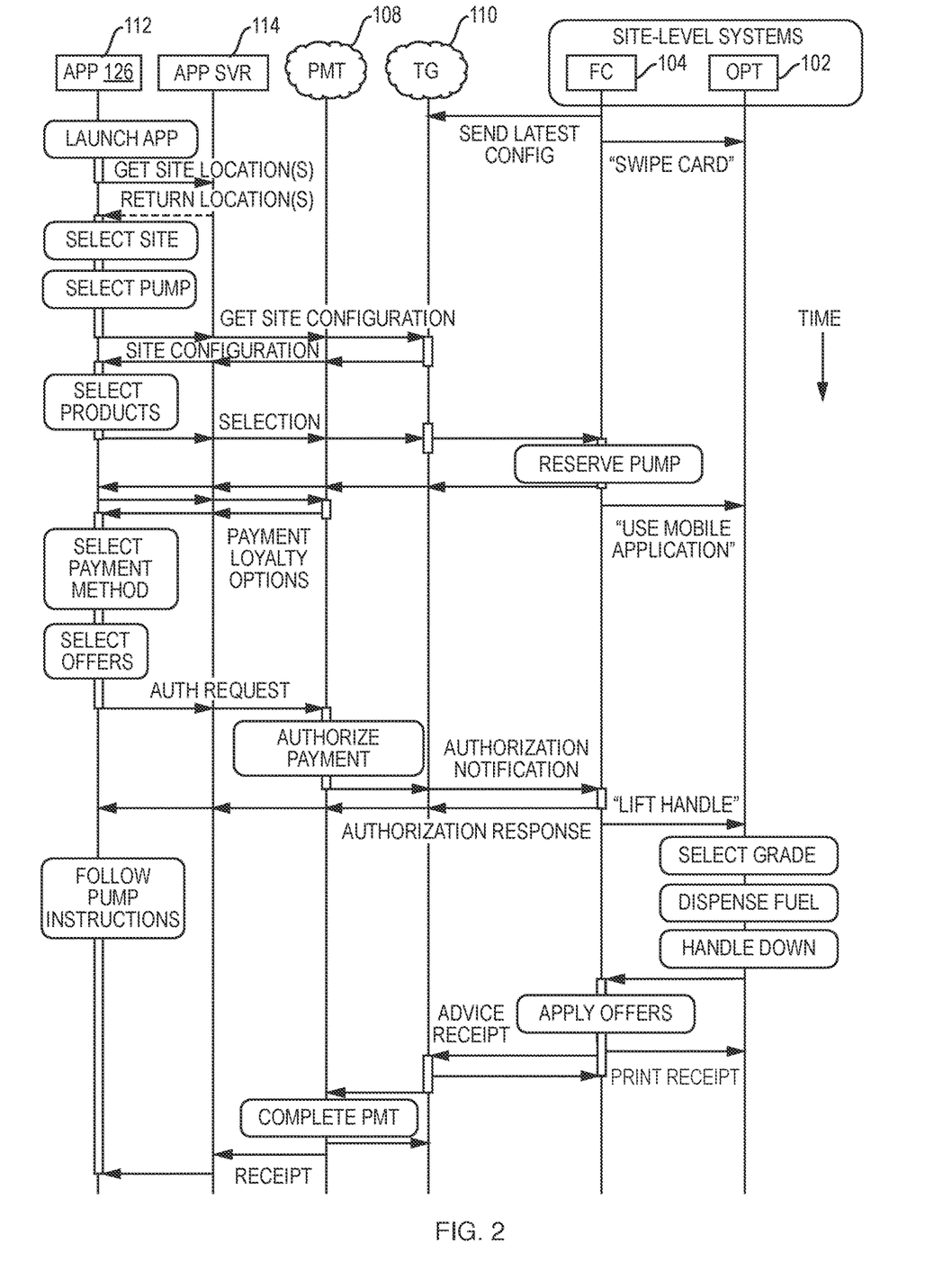
FIG. 2 depicts a flow diagram in the form of a swim lane configuration to illustrate one exemplary operation of communications and interactions between components in the transaction-processing system of FIG. 1.

FIG. 2 depicts a flow diagram that illustrates interactions among the components of the system 100 when processing a remote transaction at a retail fueling station. The flow diagram uses a swim lane configuration with the components of the system 100 found along the top of the diagram. These components include the dispenser 102, the forecourt controller component 104, the payment processing system 108, the transaction gateway component 110, the terminal 112, and the app server 114. As also shown in FIG. 2, the terminal 112 can execute certain executable instructions in the form of an application 126 (also an "app 126").

Moving from top to bottom in the diagram, in one implementation, the forecourt controller component 104 can exchange information with the transaction gateway component 110 ("SEND LATEST CONFIG"). This information can include site configuration information, which comprises data that relates to the operations of the retail fueling station. For purposes of the remote transaction of the present example, this data may identify products and services that are available for purchase by an end user (also, "an end user") at the retail fueling station. The exchange can repeat as often as necessary to keep the information current on the forecourt controller component 104 and/or the transaction gateway component 110.

An end user can initiate the app 126 on the terminal 112 ("LAUNCH APP"). Initiation can occur on-site at the retail fueling station, e.g., when the end user parks a vehicle in front of the dispenser 102 to obtain fuel. In other examples, initiation may occur off-site, e.g., before the end user arrives at the retail fueling station. This feature may incorporate other functionality of the app 126. For example, the app 126 may permit the end user to search for locations of retail fueling stations proximate the end users' current location. This disclosure also contemplates configurations of the system 100 in which the app 126 can automatically initiate (i.e., without end user interaction) and begin operation on the terminal 112, e.g., by way of an initiation signal the terminal 112 receives from the transaction gate 110 when the terminal 112 is within a pre-determined range of the retail fueling station.

Examples of the app 126 can exchange information with the app server 114 ("GET SITE LOCATION(S)" and "RETURN LOCATION(S)"). This information can include data that defines the location of the retail fueling station. In one example, the data can define various location, e.g., of retail fueling stations that are proximate and/or within the pre-determined range of the location of the terminal 114. The end user can use the app 126 to select the retail fueling station from among the locations ("SELECT SITE"). In one example, as shown in FIG. 2, the app 126 can allow the end user to select the dispenser 102 at the retail fueling station to dispense fuel ("SELECT PUMP").

The app 126 can also exchange information with the transaction gateway component 110. The app 126 may initiate this exchange with a request for site configuration information ("GET SITE CONFIGURATION"). In general, the site configuration information can include data that describes features of the retail fueling station where the end user wishes to complete the transaction. The transaction gateway component 110 can provide this data to the app 126 via the terminal 114 ("SITE CONFIGURATION"). Examples of data that relates to the site configuration can include one or more product records that define products and/or service that are available for purchase via the remote transaction. These products and services may include different grades or prices of fuel, car washes, or special offers particular to that site ("local offers"). In one example, the app 126 can present the product records to the user using a display, e.g., a touch screen display, on the terminal 112.

The end user can interact with the app 126 to select one or more product(s) ("SELECT PRODUCTS"). In response to the end user selection (or other indication the end user selection is complete), the app 126 can exchange information with the transaction gateway component 110 to identify the end user selection ("SELECTION"). The transaction gateway component 110 can process the end user selection, generating a reservation command to the forecourt controller component 104. If the end user selects to purchase fuel, the reservation command can instruct the forecourt controller component 104 to reserve the fuel dispenser 102 ("RESERVE PUMP"). In one example, the forecourt controller component 104 can send a message to the dispenser 102 to cause the dispenser 102 to display a "USE MOBILE APPLICATION" message. This feature provides feedback to the end user and/or others (e.g., a station attendant) to indicate the status (e.g., a reserved status) of the dispenser 102.

As further shown on FIG. 2, the app 126 can exchange information with the payment-processing system 108. This information can include data that relates to payment options and/or offers (e.g., coupons) relevant to the remote transaction ("PAYMENT, LOYALTY OPTIONS"). Examples of these options can provide the end user with a selection of available payment methods (e.g., cash, credit, debit, etc.) and a selection of loyalty-program options (e.g., special offers, coupons, loyalty point offers, etc.).

In one implementation, the end user can interface with the app 126, via the terminal 112, to select a payment method ("SELECT PAYMENT METHOD") and/or desired offers and loyalty-program options ("SELECT OFFERS"). Examples of the app 126 may store an end user identifier (e.g., a loyalty-program membership number) for ready access, e.g., to auto-populate a field. In other examples, the terminal 112 may store the end user identifier, e.g., as a phone number and/or SIM card number). The app 126 may require one or more payment inputs, which the end user can complete to allow the app 126 to initiate the purchase.

Completion of the requisite payment inputs can cause the app 126 to exchange information with the payment-processing system 108. This information can include an authorization request for use by the payment-processing component 108 ("AUTHORIZATION REQUEST"). This authorization request can include payment information, e.g., the end user's debit card number. In one example, the payment-processing component 108 can generate an authorization notification to authorize payment for the purchase. The payment-processing component 108 can convey the authorization notification as data that is part of one or more exchanges of information with the transaction gateway component 110 ("AUTHOR PAYMENT"). The authorization notification may avoid use of end user-specific information (e.g., the end user's debit card number), which can secure the remote transaction to advantageously reduce the probability of theft, e.g., of the end user's debit card number.

In response to the authorization notification, the transaction gateway component 110 can exchange information with the forecourt controller component 104. This information may include data to authorize use of the dispenser 102 and/or or other products and services (e.g., car wash) by the end user ("AUTHORIZATION NOTIFICATION"). The forecourt controller component 104 can exchange information with the dispenser 102, e.g., in response to this authorization. This information can include data that activates the dispenser 102 to allow the end user to dispense fuel. In one example, the data can cause the dispenser 102 to display a message, which informs the end user that the dispenser 102 is ready to dispense fuel ("LIFT HANDLE"). Moreover, the forecourt controller component 104 and/or the transaction gateway component 110 can exchange information with the app 126 to inform the end user that the dispenser 102 is ready ("AUTHORIZATION RESPONSE"). The app 126 may display a notification to the user that prompts the end user to operate the dispenser 102 ("FOLLOW PUMP INSTRUCTIONS"). Examples of this notification can use text and/or indicators (e.g., visible indicators, audible indicators, tactile indicators, etc.). The end user can interact with the dispenser 102 (now authorized) to dispense the fuel. In one example, the end user performs one or more steps to dispenser the fuel (e.g., "SELECT GRADE," "DISPENSE FUEL," "HANDLE DOWN"). The dispenser 102 and/or the app 122 may provide one or more indications (e.g., a visual message) that indicates to the end user the next and/or subsequent steps.

Continuing down the flow diagram of FIG. 2, the dispenser 102 can exchange information with the forecourt controller component 104. This information may include data that indicates when the end user completes fueling, e.g., in response to the end user placing the handle in a position that corresponds to the HANDLE DOWN step. This information may prompt the forecourt controller component 104 to apply any special offers or discounts ("APPLY OFFERS") to the final costs and, in one example, to exchange information with the dispenser 102. This information may include data that causes the dispenser 102 to print a receipt ("PRINT RECEIPT"). The forecourt controller component 104 may also exchange information with the transaction gateway component 110. This information can include data to notify the transaction gateway component 110 that the fueling is complete ("ADVICE, RECEIPT"). The transaction gateway component 110 can exchange information with the payment-processing component 108. This information may include data that notifies the payment-processing component 108 of the amount of the fuel and/or the total cost of the purchase (e.g., cost for fuel and car wash). The payment-processing component 108 can use this notification to complete payment for the fueling ("COMPLETE PMT"). In one example, the payment-processing component 108 can exchange information with the transaction gateway component 110 and the app 126. This information may include data that notifies the transaction gateway component 110 and the app 126 that the transaction is complete ("RECEIPT"). This information can also prompt the app 126 to provide notification to the end user that the transaction is complete, e.g., by providing visual indication on the display of the terminal 112.

The components of the system 100 (e.g., the transaction gateway component 110, the terminal 112, and the app server 114) can utilize executable code and instructions to complete one or more steps outlined above. These executable instructions can form one or more programs (also "software" and "firmware"). These programs can mediate interaction between components of the system 100 and the end user at and/or near the retail fueling station, e.g., through the terminal 112. For example, the terminal 112 can execute programs that allow the end user to initiate and complete the purchase. These types of devices may include a processor configured to execute one or more executable instructions, e.g., in the form of one or more programs. Exemplary programs can, for example, generate an interface on a display, e.g., a graphical user interface (GUI). The app server 114 (and the transaction gateway component 110) can have information the terminal 112 renders as a representation (e.g., icons, buttons, text, video, etc.) on the display. The end user can utilize this representation to complete the purchase and/or to interact with components that are part of the system 100.

The components of the system 100 can utilize one or more processors to execute instructions stored on a non-transitory computer-readable medium. Examples of this medium can include the disk 116 (FIG. 1) and/or another embodiment of a computer-readable medium, e.g., as discussed below with reference to FIG. 9. The instructions on the computer-readable medium may include instructions that instruct operation of the terminal 112 (FIG. 1). This operation may implement and/or specify a waiting period that defines a pre-determined period of time for the terminal 112 to await receipt of the site location code. In other examples, the operation may poll the retail fueling location in an attempt to receive a return signal and/or other indication that will originate the site location code. In still other examples, the operation of the terminal 112 may to receive the site location code.

The medium may also include instructions to retrieve site configuration information in response to the received site location code. These instructions may instruct the terminal 112 to access a database, as discussed above. Exemplary databases include relational databases, flat file, key-value file, or other system for storing data. These databases can reside local to the processor and/or remote from the processor (e.g., external server 122 of FIG. 1). The database can include data stored on volatile storage devices (e.g., random-access memory), nonvolatile storage devices (e.g., hard-disk drives), or any combination thereof. In one example, the database comprises a device, e.g., a network-attached storage device, including one or more volatile or non-volatile storage devices. The database can also be a remote database hosted by a database-services company.

Data can be stored in the database, or retrieved therefrom, by operations on storage devices connected to a particular processor via any communicative connection, e.g., a local connection such as a processor local bus or ATAPI, a network connection such as TCP/IP over Ethernet, or a wide-area network connection such as a T3 line. It is not required that the information retrieved be stored in exactly its retrieved form in the database. For example, stored queries can be used to dynamically produce some or all of the information retrieved from the database.

The medium can also include instructions that instruct the terminal 112 to await receipt of a product selection that identifies one or more product records in the retrieved site configuration information. These instruction to determine whether any of the selected product record(s) correspond to a reservable product and, to, if any do correspond, automatically produce a reservation command requesting reservation of the reservable product(s) corresponding to one or more of the selected product record(s). At least one of the products can be service at a fuel dispenser and at least one of the products can be a car wash.

Figure 3:
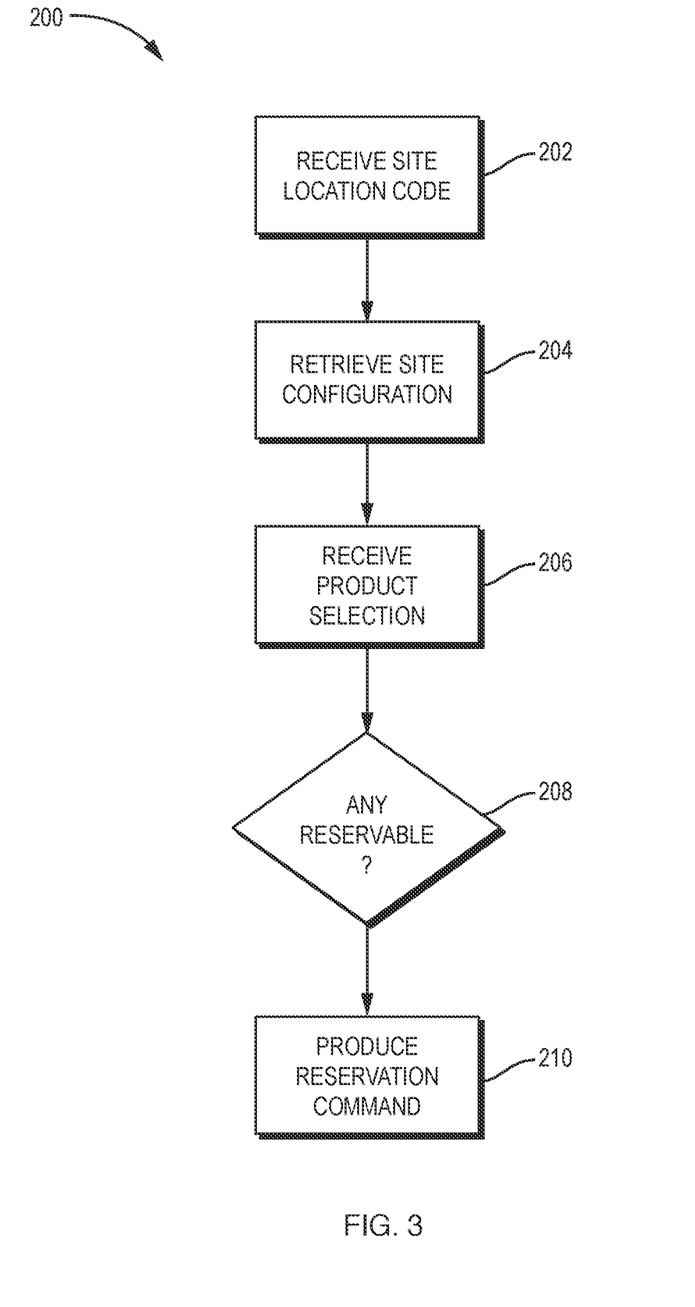
FIG. 3 depicts a flow diagram of an exemplary embodiment of a method for processing transactions using a mobile device at a retail fueling station.

FIG. 3 depicts a flow diagram of an exemplary embodiment of a method 200 of processing transactions, e.g., the remote transactions at a retail fueling station. The method 200 includes, at step 202, receiving a site location code and, at step 204, retrieving site configuration information that corresponds to the site location code. In one embodiment, the method 200 can also include accessing a database with the information. The method 200 also includes, at step 206, receiving a product selection. At step 208, the method 200 includes identifying a reservable product among the product selection. The method 200 further includes, at step 210, producing and/or generating an output, e.g., a reservation command. In one embodiment, the steps of the method 200 can follow consecutive order, i.e., step 204 follows step 202, step 206 follows step 204, step 208 follows step 206, etc.

Collectively, one or more of the steps of the method 200 can be coded as one or more executable instructions (e.g., hardware, firmware, software, software programs, etc.). These executable instructions can be part of a computer-implemented method and/or program, which can be executed by a processor and/or processing device. The processor may be part of a transaction gateway component (e.g., transaction gateway component 110 of FIGS. 1 and 2), which is adapted to execute these executable instruction, as well as to process inputs and to generate outputs, as set forth herein.

The site location code (e.g., at step 202) can include data that conveys information about the retail fueling station where the end user wishes to complete the remote transaction. Examples of the site location code can incorporate numeric, alphabetic, and alpha-numeric coding. This coding can reflect geographic information (e.g., address, geospatial coordinates, etc.) about the retail fueling station. In other examples, the coding can operate as a unique identifier (e.g., a store number, a domain name, and/or a GUID) that corresponds to the retail fueling station.

As discussed above, the site configuration information (e.g., at step 204) can include data that identifies products and services that are available for purchase by the end user at the retail fueling station. For purposes of the examples and embodiments discussed herein, these products and services can include fuel and car washes, although this disclosure contemplates other products and services (e.g., novelties, food products, etc.). Table 1 below provides one example of site configuration information:

TABLE 1

| PRODUCT RECORD NO. | PRODUCT DESCRIPTION | Product Identifier Field | PRICE |
| --- | --- | --- | --- |
| 0 | FUEL SERVICE AT PUMP 1 | RESERVABLE | US$3.499/GAL |
| 1 | FUEL SERVICE AT PUMP 2 | RESERVABLE | US$3.499/GAL |
| 2 | FUEL SERVICE AT PUMP 3 | RESERVABLE | US$3.499/GAL |
| 3 | FUEL SERVICE AT PUMP 4 | RESERVABLE | US$3.499/GAL |
| 4 | CAR WASH | RESERVABLE | US$9.99 |
| 5 | ACME CANDY BAR | NON-RESERVABLE | US$0.99 |

As shown in Table 1 above, the site configuration information can organize the products and services available at the retail fueling station into product records (e.g., product records 0-5 in Table 1). The product records can include one or more fields (e.g., a product record number field, a product description field, a product identifier field, and a pricing field). The product identifier field assigns the product and service in the product record a reservable product identifier (e.g., product records 0-4 in Table 1) or a non-reservable product identifier (e.g., product record 5 in Table 1). In one example, the reservable product identifier indicates that the end user can purchase the corresponding product and service as part of the remote transaction. The non-reservable product identifier, on the other hand, describes products and services that are not part of the remote transaction.

In one implementation, the products and services with the reservable product identifier are those products and services to which the system 100 (FIG. 1) can grant exclusive access to the end user for a period of time. In Table 1, for example, the end user can reserve fuel service at a pump (e.g., the fuel dispenser 102 of FIG. 1). The product in this example is the service of providing fuel, not the fuel itself. The end user can also reserve a car wash, which can provide the end user with a reservation and/or timeslot to utilize an automated car wash. Confirmation of the reservation can include a printed ticket from the pump and/or electronic message (e.g., text message) that includes information to activate and/or authorize the automated car wash.

The non-reservable product identifier includes products and services the end user does not have ready access to receive, e.g., at the fuel dispenser 102 (FIG. 1). Examples of the non-reservable products may include lottery tickets, novelties, candy, soft drinks, and other food products. These types of products are often sold remote from the pump, e.g., at a main building of the fuel retail station and/or by way of kiosk or other interactive modality that is not readily available to the end user at the fuel dispenser 102 (FIG. 1).

The product selection (e.g., at step 206) can reflect those product records that the end user wishes to purchase as part of the remote transaction. In one embodiment, the method 200 may include one or more steps for associating the selected products and services with the products and services in the site configuration information. For example, the method 200 may include steps for tagging product records with an identifier, e.g., a purchased identifier that indicates the end user wishes to purchase the products and services of the tagged product record.

The reservation command (e.g., at step 210) requests reservation of the reservable product(s) corresponding to one or more of the selected product record(s). One or more reservation command(s) can be produced, each corresponding to a unique subset of the reservable products in the selected product record(s). For example, one command can correspond to a fuel-dispenser reservation and another command can correspond to a car wash and an oil change, for a total of two commands covering three selected reservable products.

In one implementation, a processor (e.g., processor 114 of FIG. 1) can receive a product selection of one or more of the product records in the retrieved site configuration information. This selection can indicate a end user order, which includes the product or products the end user wishes to purchase at a retail fueling station. If any of the selected product record(s) correspond to reservable products, i.e., have the reservable product identifier assigned thereto, the processor (e.g., processor 114 of FIG. 1) can generate an output that comprises one or more reservation commands.

Examples of the reservation command can request reservation of the reservable product(s). In one example, the processor (e.g., processor 114 of FIG. 1) generates a single reservation command to encompass all reservable product(s) that are part of the end user order. This disclosure also contemplates implementations, however, that use multiple reservation commands, e.g., one for each of the reservable product(s). The processor (e.g., processor 114 of FIG. 1) can also transmit the produced reservation command to a forecourt controller component (e.g., forecourt controller component 104 of FIG. 1).

Figure 4:
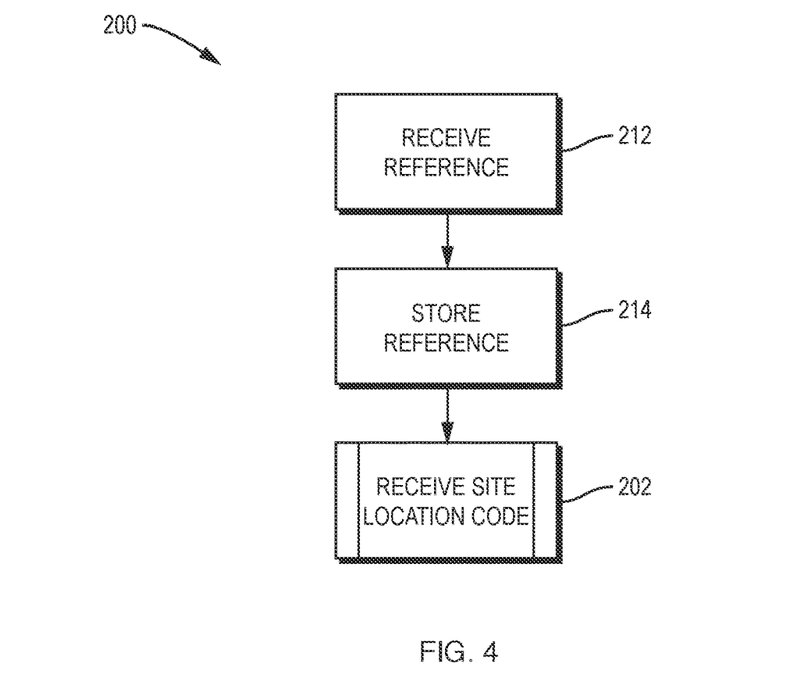
FIG. 4 depicts a flow diagram of the exemplary method of FIG. 2 to illustrate additional features that facilitate processing transactions using a mobile device at a retail fueling station.
Figure 5:
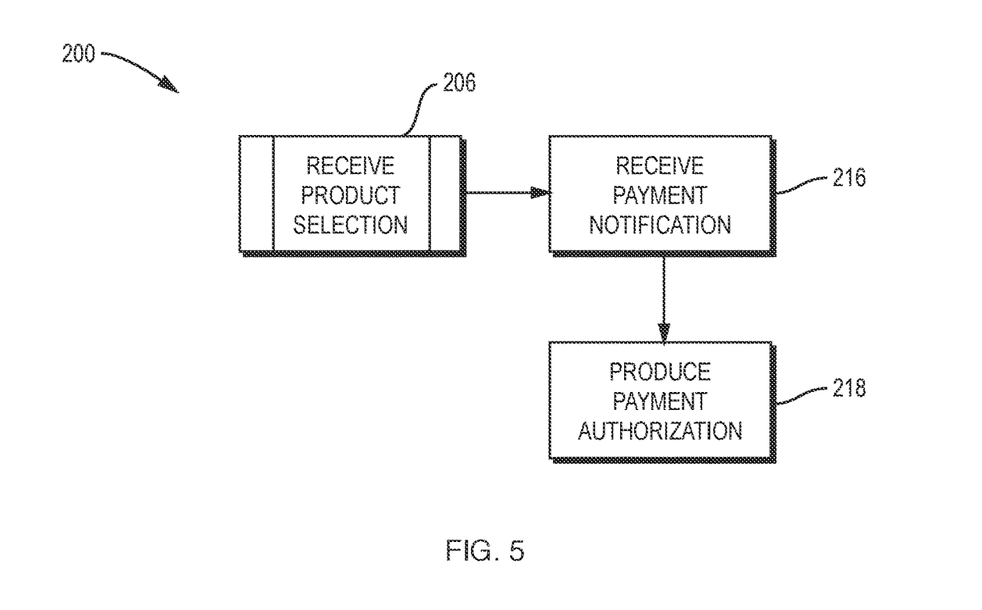
FIG. 5 depicts a flow diagram of the exemplary method of FIG. 2 to illustrate additional features that facilitate processing transactions using a mobile device at a retail fueling station.
Figure 6:
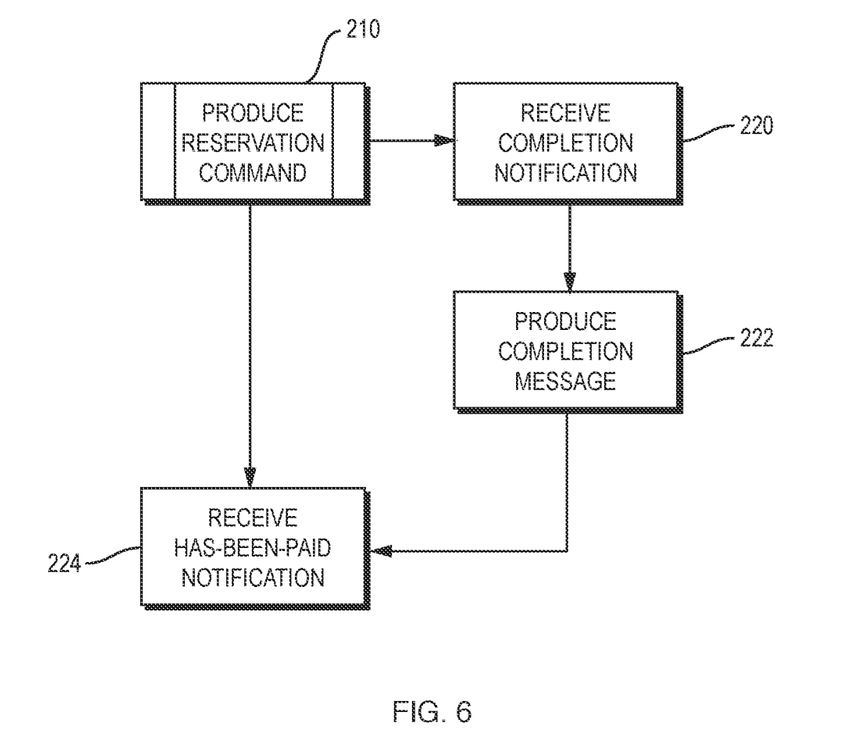
FIG. 6 depicts a flow diagram of the exemplary method of FIG. 2 to illustrate additional features that facilitate processing transactions using a mobile device at a retail fueling station.

FIGS. 4, 5, and 6 illustrate flow diagrams that describe one or more additional features as part of embodiments of the method 200. In FIG. 4, the method 200 further includes, at step 212, receiving a reference site location code and, at step 214, storing the reference site location code, e.g., in a database. In this way, the reference site configuration information becomes accessible by querying the database with a key corresponding to the reference site location code. In one example, the method 200 may include one or more steps for receiving site configuration information, which may include product records corresponding to the received reference site location code.

The embodiment of the method 200 in FIG. 5 further includes, at step 216, receiving payment notification and, at step 218, producing a payment authorization. This notification corresponds to one or more of the received selected product record(s). The authorization can be substantially a copy of the notification (forwarding) or can be a new message carrying at least some of the information in the notification.

As shown in FIG. 6, embodiments of the method 200 can also include, at step 220, receiving a completion notification and, at step 220, producing a completion message. The method 200 may further include, at step 222, receiving a payment received notification. The transaction completion message can include additional information not present in the transaction-complete notification, or can include transformations of information from the transaction-complete notification, or neither. The transaction completion message can be transmitted to a payment-processing component (e.g., the payment-processing component 108). Examples of the payment-processing component can include debit-card transaction processors owned or operated by a payment provider (e.g., a bank).

Figure 7:
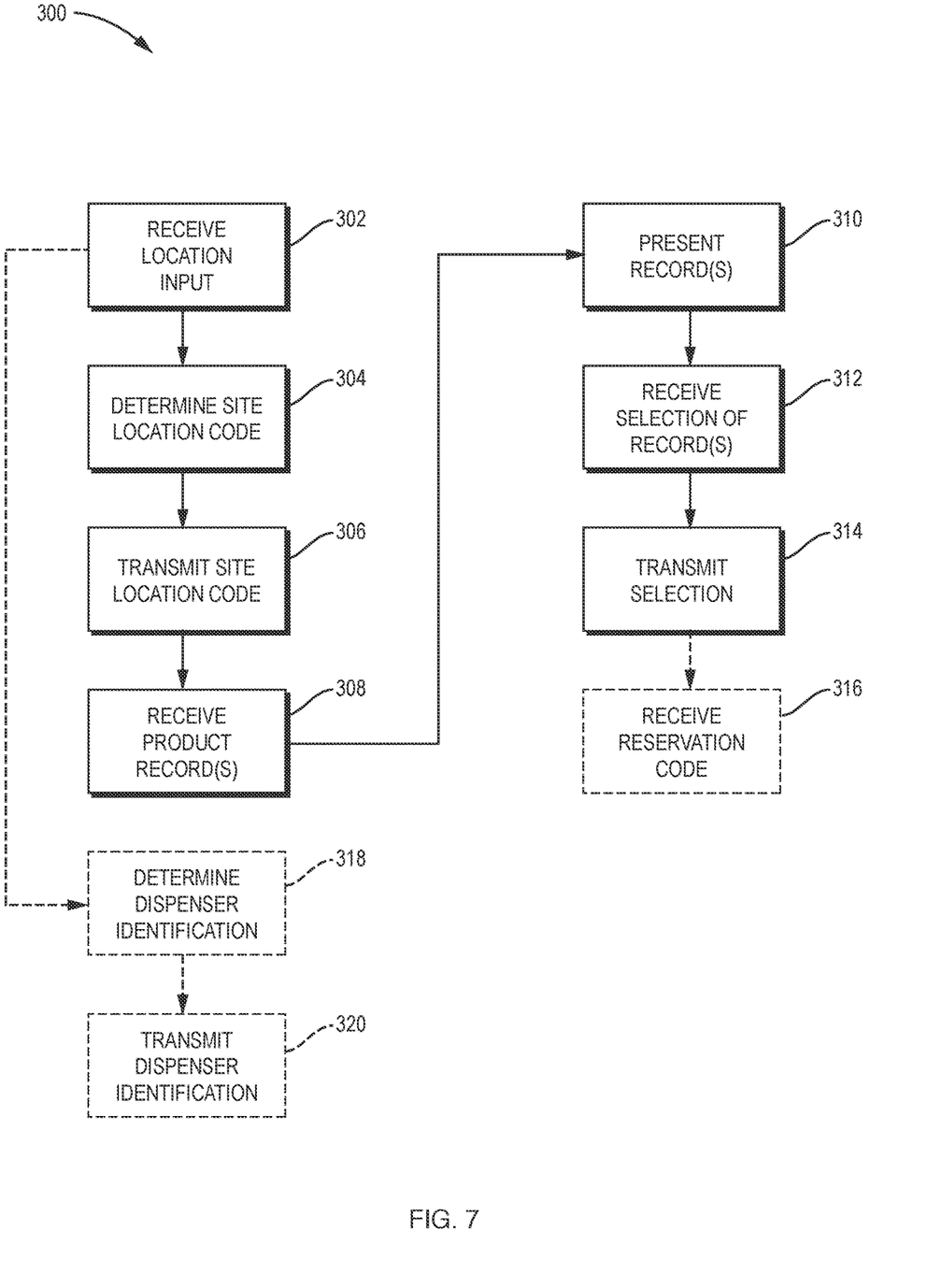
FIG. 7 depicts a flow diagram of an exemplary embodiment of a method for operating a mobile device to complete a transaction at a retail fueling station.

FIG. 7 depicts a flow diagram of an exemplary embodiment of a method 300 to facilitate a remote transaction via a portable computing device (e.g., terminal 112 of FIGS. 1 and 2). The method 300 includes, at step 302, receiving a location input, at step 304, identifying a site location code corresponding to the location input, and, at step 306, generating a first output that includes the site location code. The method 300 also includes, at step 308, receiving one or more product records. Examples of these product records may form all and/or part of the site configuration information (discussed herein and shown by example in Table 1). The method 300 can further include, at step 310, generating a representation of the product records on a display and, at step 312, receiving an input that corresponds with a purchase selection of the products records that are shown in the visual representation. The method 300 can also include, at step 314, generating a second output that includes the purchase selection. In one embodiment, the method 300 can include, at step 316, receiving a reservation code, which can occur in response to the output (e.g., at step 314). The method 300 can also include, at step 318, determining a dispenser identification and, at step 320, generating a third output that includes the dispenser identification. In one embodiment, the steps follow consecutive order, i.e., step 304 follows step 302, step 306 follows step 304, step 308 follows step 306, etc.

Collectively, one or more of the steps of the method 300 can be coded as one or more executable instructions (e.g., hardware, firmware, software, software programs, etc.). These executable instructions can be part of a computer-implemented method and/or program, which can be executed by a processor and/or processing device. The processor may be part of a terminal (e.g., terminal 112 of FIGS. 1 and 2), which is adapted to execute these executable instruction, as well as to process inputs and to generate outputs, as set forth herein.

Figure 8:
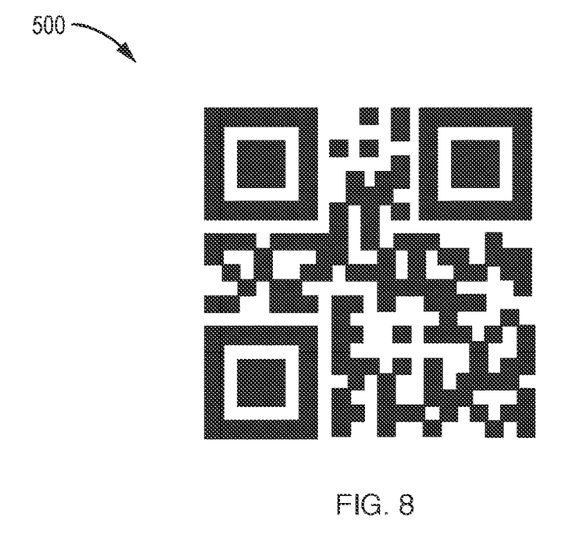
FIG. 8 depicts an exemplary two-dimensional barcode that can identify, or contain information about, a product sold at a refueling station.

The location input can comprise data to identify the location of the terminal. This data may comprise coordinates, e.g., GPS coordinates for the terminal. In other examples, the data can arise from a captured image of an image, e.g., an image of a QR CODE® or other barcode. An example of a two-dimensional barcode is shown in FIG. 8 and identified by the numeral 500.

To identify the site location code (e.g., at step 304), the data in the location input can be compared to other data that describes the location of the retail fueling station proximate the terminal. This location may utilize site coordinates retrieved and/or accessed on a server (e.g., "GET SITE LOCATION(S)" shown in FIG. 2 above). In one embodiment, the method 300 may further include steps for receiving an scanned-image location input and for decoding the scanned-image location input to determine the site coordinates. For example, the terminal may capture an image of the barcode 500 and decode the barcode 500 to yield text, e.g., "42//5761796E65." This text may correspond to the location code for the retail fuel station.

As discussed above, the product records relate to a respective product. In one example, at least one of the product records can relate to service at a fuel dispenser and at least one of the product records can relate to a car wash. The representation (e.g., at step 310) can present the products records to the end user using a visual display, e.g., text and/or images to describe the product. This text can be shown on the terminal (e.g., terminal 112 of FIGS. 1 and 2). This disclosure also contemplates other representations that can take advantage of other senses, e.g., perceptible tactile, gustatory, or olfactory sensations. The end user can interact with the display to select from among products those products to purchase. In one example, the end user can touch the visual display to complete selection of the products that are part of the purchase.

The second output (e.g., at step 314) conveys the selection to the transaction gateway component, as described above. The second output may include a copy of the selected product record, a unique ID for each selected product, a token or other unique value extracted from each received product record that was selected, or one or more other data item(s) identifying the selected product record(s).

The reservation code (e.g., at step 316) can identify the product records as a reservable-product record (e.g., using the reservable product identifier) or a non-reservable-product record (e.g., using the non-reservable product identifier), and the received reservation code corresponds to one of the selected reservable-product records. For example, if one of the selected reservable-product records is a car wash, the reservation code can be a token for use at the car wash point-of-sale (POS) component. The token can, for example, activate the car wash. In one implementation, the terminal (and/or the app) can display the reservation code to the user, spontaneously or on user request, and the user can manually enter the code into the car-wash POS system, e.g., using a keypad. In other implementations, the terminal (and/or the app) can store the reservation code and transmit it, e.g., via Bluetooth®, to the car wash POS component, spontaneously, on user request, or when the car-wash POS component comes into communications range of the terminal.

The dispenser identification (ID) value (e.g., at step 318) can be determined using an image, e.g., the image of the barcode 500. As discussed above, after decoding the text "42//5761796E65" from the two-dimensional barcode 500, the terminal can split that decoded text at the "//" delimiter and use the portion left of the delimiter as the dispenser ID. In one example, that portion is "42." If a barcode includes data formatted according to a selected standard, the data can be parsed according to that standard to determine its parts, e.g., dispenser ID value.

Transmitting the determined ID value (e.g., at step 320) can send the information in the barcode to the transaction gateway component (e.g., "SELECT PUMP" stage in FIG. 3 above). When the end user is parked in front of a particular fuel dispenser and can capture an image of a barcode located thereon, no additional information is required to determine the pump number if the barcode encodes the pump number.

Table 2 shows an example of the site configuration information of Table 1 with information for identify site location, pump identification, and the like:

TABLE 2

INFO ID: {0a3f7880-5507-11e2-81a1-0002a5d5c51b}

| PRODUCT RECORD NO. | PRODUCT DESCRIPTION | Product Identifier Field | SER #: 42 PRICE |
|---|---|---|---|
| 0 | FUEL SERVICE AT PUMP 1 | RESERVABLE | US$3.499/GAL |
| 1 | FUEL SERVICE AT PUMP 2 | RESERVABLE | US$3.499/GAL |
| 2 | FUEL SERVICE AT PUMP 3 | RESERVABLE | US$3.499/GAL |
| 3 | FUEL SERVICE AT PUMP 4 | RESERVABLE | US$3.499/GAL |
| 4 | CAR WASH | RESERVABLE | US$9.99 |
| 5 | ACME CANDY BAR | NON-RESERVABLE | US$0.99 |

The site configuration information is identified with a globally-unique ID (GUID) ("INFO ID") and a serial number ("SER #"). Each time the site configuration is updated, the serial number is incremented. The combination of GUID and serial number uniquely identifies this set of product records.

Each product record is identified by number ("RECORD #"). Each record has a "PRODUCT DESCRIPTION" identifying the product. The product description can be human-readable, machine-readable, or both. Each record indicates whether that product is reservable ("RESERVABLE?"). A price is provided so the end user can select based on price if desired ("PRICING INFORMATION").

In the example of Table 2, the indication of the selected product records includes the INFO ID and SER # of the dataset, and the RECORD # of each selected product. Transaction gateway component 210 (FIG. 2) can use these three values to uniquely identify the product desired and perform appropriate transaction processing.

In view of the foregoing, various prior schemes require a payment terminal in a fuel dispenser to compute total-amount information and transmit it to the POS system. In contrast, in examples described herein, a transaction gateway component sends the list of products to the end user's terminal. This advantageously permits readily modifying the available products and offers. This also permits receiving end user orders from locations other than a particular product dispenser. This also permits receiving orders without requiring a network connection configured to accept unsolicited incoming requests. Such a network connection can be vulnerable to denial-of-service and other attacks. In contrast, the terminal described herein receives the product records from the transaction gateway component, which is then prepared to receive an order. Neither the payment terminal nor the forecourt controller component need accept incoming connections.

Throughout this disclosure, some aspects are described in terms that would ordinarily be implemented as software programs. The equivalent of such software can also be constructed in hardware (hard-wired or programmable), firmware, or micro-code. Accordingly, aspects of the present invention may take the form of an entirely hardware embodiment, an entirely software embodiment (including firmware, resident software, or micro-code), or an embodiment combining software and hardware aspects. Software, hardware, and combinations can all generally be referred to herein as a "service," "circuit," "circuitry," "module," or "system." Various aspects can be embodied as systems, methods, or computer program products. Because data manipulation algorithms and systems are well known, the present description will be directed in particular to algorithms and systems forming part of, or cooperating more directly with, systems and methods described herein. Other aspects of such algorithms and systems, and hardware or software for producing and otherwise processing signals or data involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

Figure 9:
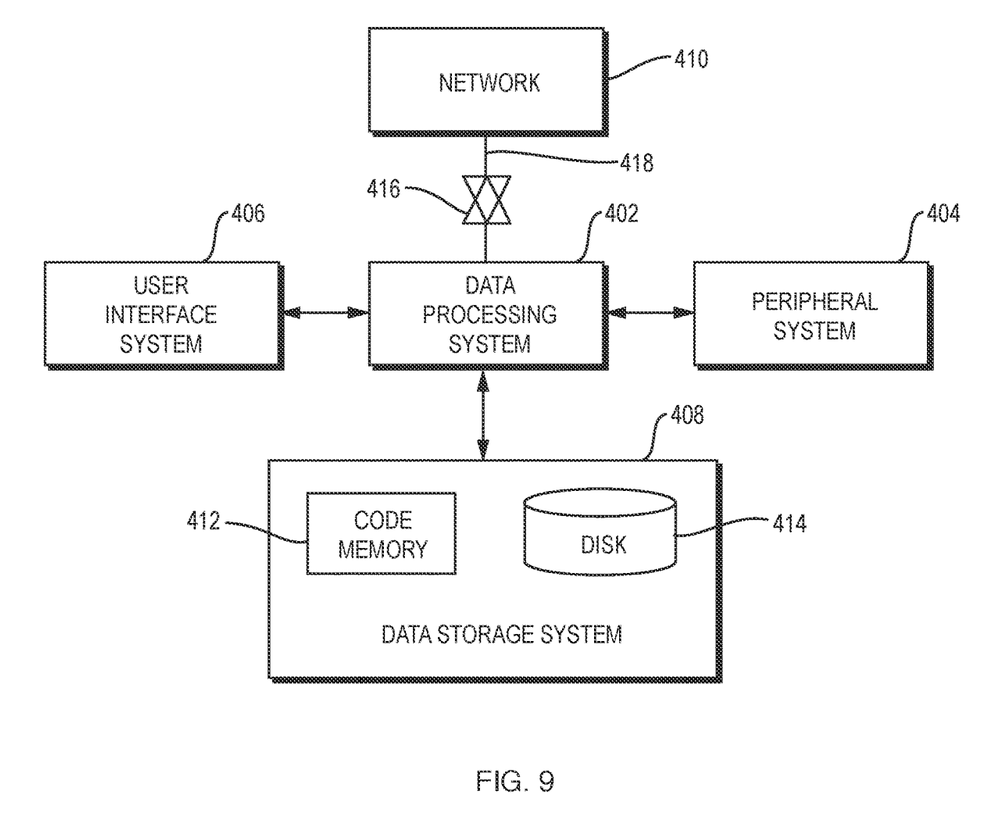
FIG. 9 depicts a high-level schematic diagram of an example of a data-processing system.

FIG. 9 is a high-level diagram showing the components of an exemplary data-processing system for analyzing data and performing other analyses described herein. The system includes a data processing system 402, a peripheral system 404, a user interface system 406, and a data storage system 408. The peripheral system 404, the user interface system 406 and the data storage system 408 are communicatively connected to the data processing system 402. The data processing system 402 can be communicatively connected to a network 410, e.g., the Internet or an X.25 network, as discussed below. The transaction gateway component (e.g., transaction gateway component 110 of FIGS. 1 and 2) and/or the terminal (e.g., terminal 112 of FIGS. 1 and 2) can each include one or more of systems 402, 404, 406, 408, and can each connect to one or more network(s) 410.

The data processing system 402 includes one or more data processor(s) that implement processes of various aspects described herein. A "data processor" is a device for automatically operating on data and can include a central processing unit (CPU), a desktop computer, a laptop computer, a mainframe computer, a personal digital assistant, a digital camera, a cellular phone, a smartphone, or any other device for processing data, managing data, or handling data, whether implemented with electrical, magnetic, optical, biological components, or otherwise.

The phrase "communicatively connected" includes any type of connection, wired or wireless, between devices, data processors, or programs in which data can be communicated. Subsystems such as the peripheral system 404, the user interface system 406, and the data storage system 408 are shown separately from the data processing system 402 but can be stored completely or partially within the data processing system 402.

The data storage system 408 includes or is communicatively connected with one or more tangible non-transitory computer-readable storage medium(s) configured to store information, including the information needed to execute processes according to various aspects. A "tangible non-transitory computer-readable storage medium" as used herein refers to any non-transitory device or article of manufacture that participates in storing instructions which may be provided to the processor for execution. Such a non-transitory medium can be non-volatile or volatile. Examples of non-volatile media include floppy disks, flexible disks, or other portable computer diskettes, hard disks, magnetic tape or other magnetic media, Compact Discs and compact-disc read-only memory (CD-ROM), DVDs, BLU-RAY disks, HD-DVD disks, other optical storage media, Flash memories, read-only memories (ROM), and erasable programmable read-only memories (EPROM or EEPROM). Examples of volatile media include dynamic memory, such as registers and random access memories (RAM). Storage media can store data electronically, magnetically, optically, chemically, mechanically, or otherwise, and can include electronic, magnetic, optical, electromagnetic, infrared, or semiconductor components.

Aspects of the present invention can take the form of a computer program product embodied in one or more tangible non-transitory computer readable medium(s) having computer readable program code embodied thereon. Such medium(s) can be manufactured as is conventional for such articles, e.g., by pressing a CD-ROM. The program embodied in the medium(s) includes computer program instructions that can direct data processing system 402 to perform a particular series of operational steps when loaded, thereby implementing functions or acts specified herein.

In one implementation, the data storage system 408 includes code memory 412, e.g., a random-access memory, and disk 414, e.g., a tangible computer-readable rotational storage device such as a hard drive. Computer program instructions are read into the code memory 412 from the disk 414, or a wireless, wired, optical fiber, or other connection. The data processing system 402 then executes one or more sequences of the computer program instructions loaded into the code memory 412, as a result performing process steps described herein. In this way, the data processing system 402 carries out a computer implemented process. For example, blocks of the flowchart illustrations or block diagrams herein, and combinations of those, can be implemented by computer program instructions. The code memory 412 can also store data, or not: the data processing system 402 can include Harvard-architecture components, modified-Harvard-architecture components, or Von-Neumann-architecture components.

Computer program code can be written in any combination of one or more programming languages, e.g., Java, Smalltalk, C++, C, or an appropriate assembly language. Program code to carry out methods described herein can execute entirely on a single data processing system 402 or on multiple communicatively-connected data processing systems 402. For example, code can execute wholly or partly on a user's computer and wholly or partly on a remote computer or server. The server can be connected to the user's computer through the network 410.

The peripheral system 404 can include one or more devices configured to provide digital content records to the data processing system 402. For example, the peripheral system 404 can include digital still cameras, digital video cameras, cellular phones, or other data processors. The data processing system 402, upon receipt of digital content records from a device in the peripheral system 404, can store such digital content records in the data storage system 408.

The user interface system 406 can include a mouse, a keyboard, another computer (connected, e.g., via a network or a null-modem cable), or any device or combination of devices from which data is input to the data processing system 402. In this regard, although the peripheral system 404 is shown separately from the user interface system 406, the peripheral system 404 can be included as part of the user interface system 406.

The user interface system 406 also can include a display device, a processor-accessible memory, or any device or combination of devices to which data is output by the data processing system 402. In this regard, if the user interface system 406 includes a processor-accessible memory, such memory can be part of the data storage system 408 even though the user interface system 406 and the data storage system 408 are shown separately in FIG. 9.

In various aspects, the data processing system 402 includes communication interface 416 that is coupled via network link 418 to network 410. For example, communication interface 416 can be an integrated services digital network (ISDN) card or a modem to provide a data communication connection to a corresponding type of telephone line. As another example, communication interface 416 can be a network card to provide a data communication connection to a compatible local-area network (LAN), e.g., an Ethernet LAN, or wide-area network (WAN). Wireless links, e.g., WiFi or GSM, can also be used. Communication interface 416 sends and receives electrical, electromagnetic or optical signals that carry digital data streams representing various types of information across network link 418 to network 410. Network link 418 can be connected to network 410 via a switch, gateway, hub, router, or other networking device.

Network link 418 can provide data communication through one or more networks to other data devices. For example, network link 418 can provide a connection through a local network to a host computer or to data equipment operated by an Internet Service Provider (ISP).

Data processing system 402 can send messages and receive data, including program code, through network 410, network link 418 and communication interface 416. For example, a server can store requested code for an application program (e.g., a JAVA applet) on a tangible non-volatile computer-readable storage medium to which it is connected. The server can retrieve the code from the medium and transmit it through the Internet, thence a local ISP, thence a local network, thence communication interface 416. The received code can be executed by data processing system 402 as it is received, or stored in data storage system 408 for later execution.

Various aspects described herein provide consumers with flexible access to products, including reservable products. A technical effect of various aspects is permitting a terminal, such as a mobile telephone, to purchase products without rendering the forecourt controller component or POS system at the site vulnerable to network attacks or viruses originating from the terminal. In various aspects, the terminal does not communicate directly with the forecourt controller component, fuel dispenser or OPT thereon, or site POS system.

The invention is inclusive of combinations of the aspects described herein. References to "a particular aspect" and the like refer to features that are present in at least one aspect of the invention. Separate references to "an aspect" or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention. Examples of variations, combinations, and modifications that are intended to be within the scope of the claims are those having structural elements that do not differ from the literal language of the claims and those including equivalent structural elements with insubstantial differences from the literal language of the claims.

What is claimed is:

1. A fueling method, comprising:
   receiving, at a customer mobile device, a location input that identifies a location of the customer mobile device;
   identifying, at the customer mobile device, a site location code corresponding to the location input;
   receiving, at the customer mobile device, a plurality of product records that include at least fuel available for dispensing from a fuel dispenser;
   displaying, on the customer mobile device, a visual representation of the plurality of product records;
   receiving, at the customer mobile device, an input selecting for purchase at least one of the visually represented plurality of product records;
   transmitting, from the customer mobile device to a transaction gateway component, data indicating the selection, wherein the transaction gateway component is external to the fuel dispenser;
   receiving, at the customer mobile device from the transaction gateway component, a reservation code for the selected at least one of the visually represented plurality of product records; and
   transmitting, from the customer mobile device to the fuel dispenser, the received reservation code, wherein the fuel dispenser receiving the reservation code from the customer mobile device activates the fuel dispenser for customer receipt of the selected at least one of the visually represented plurality of product records.

2. The method of claim 1, wherein receiving the location input includes receiving an image or location coordinates.

3. The method of claim 1, wherein identifying the site location code includes comparing the location input to pre-stored data describing a location at which the fuel dispenser is located.

4. The method of claim 1, wherein the customer mobile device transmits the received reservation code automatically in response to the customer mobile device being in communications range of the fuel dispenser.

5. The method of claim 1, wherein the customer mobile device transmits the received reservation code in response to a user request input to the customer mobile device.

6. The method of claim 1, wherein, after the customer mobile device transmits the data indicating the selection to the transaction gateway component, the transaction gateway component communicates with a forecourt controller component to reserve the fuel dispenser for the customer.

7. The method of claim 6, the forecourt controller component is external to the transaction gateway component, the fuel dispenser, and the customer mobile device.

8. A fueling method, comprising:
   receiving, at a customer mobile device, a location input that identifies a location of the customer mobile device;
   identifying, at the customer mobile device, a site location code corresponding to the location input and corresponding to a fueling station;
   receiving, at the customer mobile device, a plurality of product records for a plurality of products available for purchase via a fuel dispenser at the fueling station, the plurality of products including at least a car wash service available at a car wash facility at the fueling station;
   displaying, on the customer mobile device, a visual representation of the plurality of product records;
   receiving, at the customer mobile device, an input selecting for customer purchase at least one of the visually represented plurality of product records corresponding to at least the service available at the car wash facility at the fueling station; and
   receiving, at the customer mobile device from the transaction gateway component, a reservation code for the selected at least one of the visually represented plurality of product records;
   wherein providing the reservation code to the car wash facility activates the car wash facility to provide the car wash service to the customer.

9. The method of claim 8, wherein the received input also selects for customer purchase fuel available for dispensing from a fuel dispenser;
   the method further comprises transmitting, from the customer mobile device to the fuel dispenser, the received reservation code, wherein the fuel dispenser receiving the reservation code from the customer mobile device activates the fuel dispenser for dispensing of the fuel.

10. The method of claim 9, further comprising transmitting, from the customer mobile device to a transaction gateway component, data indicating the received selection, wherein the transaction gateway component is external to the fuel dispenser.

11. The method of claim 9, wherein the customer mobile device does not communicate directly with the fuel dispenser.

12. The method of claim 8, wherein the providing of the reservation code to the car wash facility includes transmitting, from the customer mobile device to the car wash facility, the received reservation code.

13. The method of claim 12, the customer mobile device transmits the received reservation code automatically in response to the customer mobile device being in communications range of the car wash facility.

14. The method of claim 12, wherein the customer mobile device transmits the received reservation code in response to a user request input to the customer mobile device.

15. The method of claim 8, wherein the providing of the reservation code to the car wash facility includes the customer manually inputting the reservation code at the car wash facility.

* * * * *